United States Patent [19]　　　　　　　　　　[11]　4,129,194
Hammond et al.　　　　　　　　　　　　　　　　　　[45]　Dec. 12, 1978

[54] HOLD-DOWN DEVICE FOR STORAGE BATTERIES

[75] Inventors: Howard A. Hammond, Alexander; John F. Sardina, Williamsville, both of N.Y.

[73] Assignee: Eaton Corporation, Cleveland, Ohio

[21] Appl. No.: 819,743

[22] Filed: Jul. 28, 1977

[51] Int. Cl.² .................................................. B60R 18/02
[52] U.S. Cl. ....................................... 180/68.5; 105/51; 248/503; 429/100
[58] Field of Search .................. 180/68.5; 429/100, 99, 429/96; 105/50, 51, 466, 473; 248/499, 500, 503, 505, 154, 25; 224/42.38, 42.4, 42.1 R, 42.32

[56] References Cited

U.S. PATENT DOCUMENTS

| | | | |
|---|---|---|---|
| 2,870,855 | 1/1959 | Hildreth | 180/68.5 |
| 2,918,983 | 12/1959 | Maitland et al. | 180/68.5 |
| 3,061,662 | 10/1962 | Toce et al. | 429/99 |
| 3,248,268 | 4/1966 | Kohler | 429/96 |
| 3,894,607 | 7/1975 | Brock | 180/68.5 |

FOREIGN PATENT DOCUMENTS 1192717　5/1965　Fed. Rep. of Germany .......... 180/68.5

*Primary Examiner*—Joseph F. Peters, Jr.
*Assistant Examiner*—Milton L. Smith
*Attorney, Agent, or Firm*—Frank M. Sajovec, Jr.

[57] ABSTRACT

A battery hold down device in the form of a frame made up of four parallel angle members engageable with opposed side edges of a pair of batteries placed side by side in a battery box. The ends of the angle members are connected by flat end plates, and the inner two angle members are attached to the end plates offset upwardly in relation to the outer angle members. Bolts extending between the batteries receive washers which engage the inner angle members. Nuts received over the washers are tightened down on the bolts, to clamp the batteries between the frame and the bottom of the battery box until the offset distance of the inner angle members is overcome, thus insuring a uniform preload along the four angle members.

6 Claims, 3 Drawing Figures

HOLD-DOWN DEVICE FOR STORAGE BATTERIES

PRIOR ART STATEMENT

The following references are considered to be relevant to the present invention:

UNITED STATES PATENTS

U.S. Pat. No. 3,894,607 — Brock
U.S. Pat. No. 2,870,855 — Hildreth

U.S. Pat. No. 3,894,607 discloses a battery hold down device comprising a frame which engages the inner edges only of a pair of juxtaposed batteries.

U.S. Pat. No. 2,870,855 discloses a hold down device for a plurality of batteries, comprising a frame which requires a plurality of outwardly mounted hold-down bolts.

The present invention relates to apparatus for holding storage batteries in place in a motor vehicle, and more particularly to a hold-down device for a pair of batteries.

Heavy duty construction and forestry vehicles generally include multiple storage batteries grouped in pairs, and located in a battery box attached to the frame in a convenient location for maintenance.

Because of the severe operating conditions under which such vehicles operate it is important that the batteries be held down securely, while not complicating maintenance procedures. A typical prior art hold down device comprises a rectangular frame which engages the upper edges of the batteries, and which is secured by a plurality of vertical bolts which clamp the batteries between the frame and the bottom of the battery box.

The battery cases are made of a plastic or rubber material, and can be cracked or otherwise damaged if subjected to uneven pressure by the hold-down frame. The problem of uneven pressure can be obviated by using a large number of hold-down bolts evenly spaced around the frame; however, to be effective the bolts must be tightened evenly, which is difficult to insure in field operations. Also, a plurality of bolts can make field maintenance difficult.

From the standpoint of maintenance a battery hold-down preferably should require no more than two bolts centrally located between the pair of batteries. In prior art designs of this type, however, the outer edges of the batteries tend to be held too loosely, and additional tightening of the hold-down bolts tends to overstress the inner edges of the battery cases.

Based on the above, it is an object of the invention to provide a hold-down device for a plurality of batteries which evenly distributes a clamping force along the upper edges of the battery cases.

A further object of the invention is to provide such a hold-down device which requires no more than two hold down bolts to securely hold the batteries in place under severe operating conditions.

A further object of the invention is to provide such a hold down device which permits routine maintenance of the batteries without removal of the hold down device, and which can be easily removed for battery replacement.

To meet the above objectives the present invention provides a battery hold down in the form of a rectangular frame made up of four angle members spaced apart to engage the upper edges of a pair of batteries, and joined by flat end plates. The angle members are attached to the end plates with the two inner angle members, which engage the inner edges of the batteries, offset upward.

A pair of hold-down bolts which anchor to the bottom of the battery box are received between the two inner angle members, and are threaded at their upper ends to receive pairs of washers and nuts which bear against the inner angle members. To secure the battery the frame is placed over the batteries, and the bolts are put in place with the washers placed over the ends of the bolts and on top of the inner angle members. In this condition the outer angle members will be in contact with the edges of the batteries, but the inner angle members will be disposed above the battery by virtue of their offset mounting on the end plates. The nuts are then threaded onto the bolts and tightened until the side plates deflect sufficiently to allow the inner angle members to just contact the top of the battery. At this point each battery will be uniformly clamped along two opposed side edges. Since only two hold-down bolts are required, battery replacement is simple and a simple, visual indication of the proper hold down force is provided. The frame is of open construction, permitting routine maintenance of the battery cells with the batteries held securely in place.

Other objects and advantages of the invention will become more apparent from the following description when taken in connection with the accompanying drawings, wherein.

Figure 1:
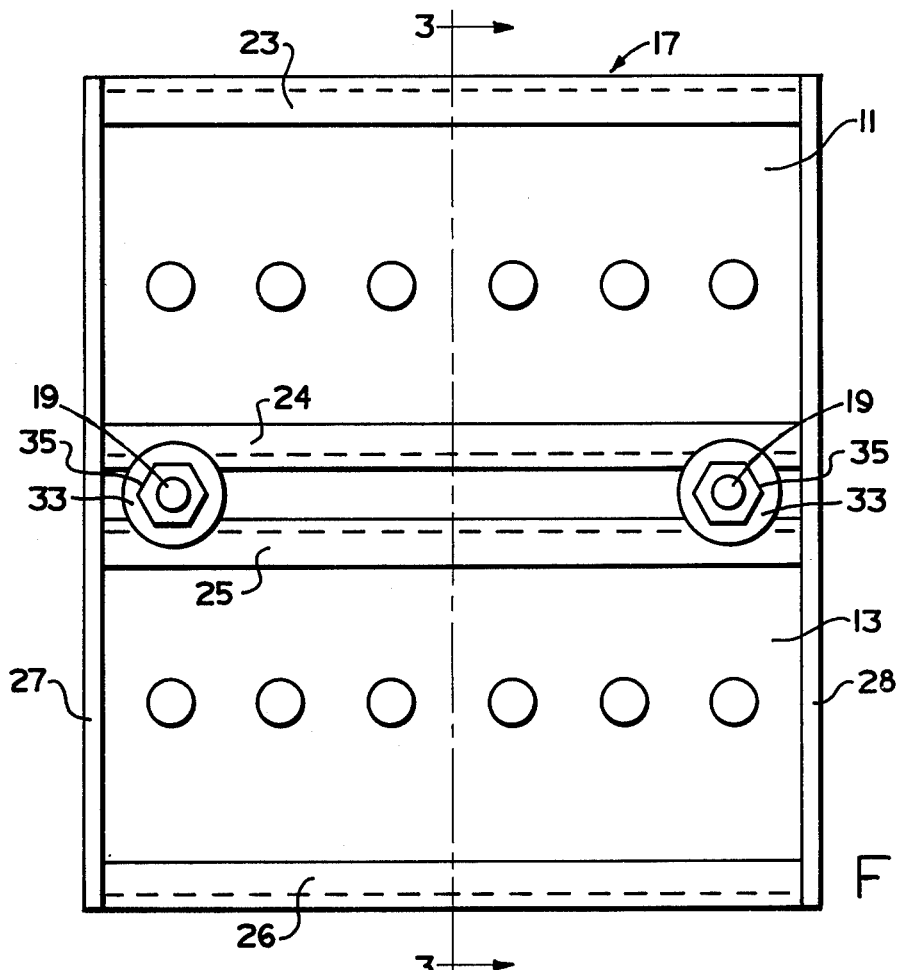
FIG. 1 is a plan view of the inventive battery hold-down device in place on top of a pair of batteries.
Figure 2:
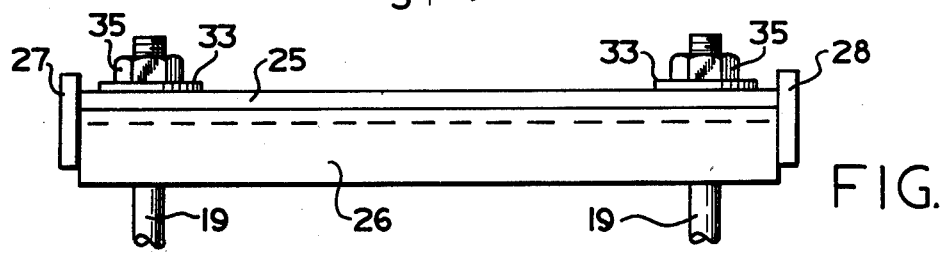
FIG. 2 is a side elevation view of the device shown in FIG. 1 with the batteries removed.

Referring to the drawings, a pair of batteries 11 and 13 are shown resting on the floor 15 of a battery box (only partially shown), which is attached to the frame of a vehicle (not shown). Referring specifically to FIG. 1, the hold-down assembly comprises an open frame 17 which rests on top of the batteries, and a pair of hold-down bolts 19 anchored to the battery box floor 15.

Figure 3:
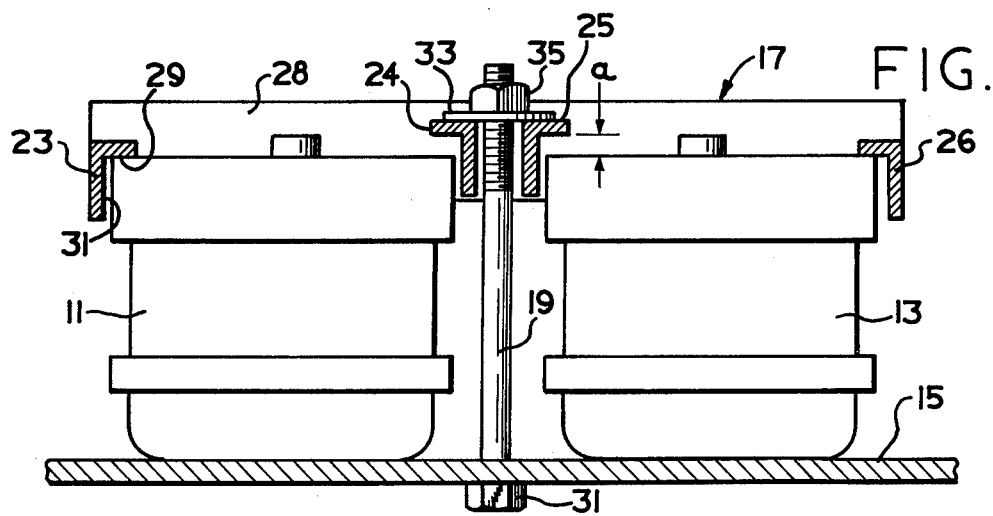
FIG. 3 is a section view taken along line 3—3 of FIG. 1.

The frame 17 comprises four angle members 23, 24, 25, 26 which engage the upper side edges of the batteries 11 and 13, and a pair of end plates 27 and 28 which connect the angle members. Referring to FIG. 3, and using angle member 23 as an example, the angle members are disposed so that the inner surface 29 of one leg of the angle overlies the upper side edge of the battery with clearance provided between the side of the battery and the inner surface 31 of the other leg. The ends of the angle members are but welded or otherwise attached to the end plates to form a rigid, open structure.

In accordance with the invention the angle members are attached to the end plates 27, 28 such that the inner two angle members 24 and 25 are spaced apart sufficiently to provide clearance for the hold-down bolts 19, and are offset upwardly by a distance "a" with respect to the mounting of the outer angle members 23 and 26 on the end plates, as shown in FIG. 3. (For purposes of clarity the distance "a" is exaggerated in FIG. 3.)

The hold-down bolts can be any form of standard bolt and can be attached to the floor of the battery box or to the vehicle frame in any convenient manner. For purposes of illustration each bolt 19 is shown extending through a hole in the battery box floor 15, and having a head 31 which engages the outside of the battery box.

The opposite end is threaded and receives a washer 33 and a nut 35.

After the batteries 11 and 13 are placed side by side in the battery box, the frame 17 is placed over the batteries, and the bolts 19 are installed from the bottom of the battery box. The washers 33 are then placed over the threaded portion of the bolts so that they are resting on top of the inner angle members 24 and 25. The nuts 35 are then threaded onto the bolts. Any number of hold-down bolts can be used; however, it is preferred that two bolts be used evenly spaced from the center of the batteries as shown in the drawings.

Before the nuts 35 are tightened on the bolts 19 only the outer angle members 23 and 26 will be in contact with the batteries, as shown in FIG. 3, the inner angle members 24 and 25 being spaced above the battery by the offset distance "a". To secure the batteries in the battery box, the nuts 35 are tightened, clamping the frame 17 between the washers 31 and the battery box floor. As the nuts are tightened, the end plates 27 and 28 will deflect until the offset distance "a" is taken up and the surfaces 29 of angle members 24 and 25 contact the battery case. The amount of the offset is selected such that when the inner angle members just contact the batteries a uniform preload will exist along the lengths of the four angle members. The amount of offset will vary with battery size; however, it has been found that for the batteries typically used in heavy duty construction equipment using end plates of 6 mm thick steel stock, an offset of about 3 mm will provide the necessay preload to adequately and uniformly hold the batteries in place. The open frame construction permits routine maintenance of the battery cells without removing the hold-down assembly. By tightening the hold-down bolts until the angle members just touch the battery a visual indication of proper tightening is provided, and the danger of overtightening and resultant damage to the batteries is minimized.

We claim:

1. A hold-down device for use with a pair of storage batteries supported in juxtaposed position on a base, including a frame, said frame comprising a first hold-down member engageable with an outside top edge of one of said juxtaposed batteries, a second hold-down member engageable with an inside top edge of said one battery, a third hold-down member engageable with the adjacent inside top edge of the other of said juxtaposed batteries, a fourth hold-down member engageable with an outside top edge of said other battery, and first and second substantially parallel end members attached to and connecting the ends of said first, second, third and fourth hold-down members; and fastener means engageable with said frame and with said base to apply a clamping force on said batteries between said frame and said base; the improvement wherein said second and third hold-down members are attached to said end members offset upwardly in relation to said first and fourth hold-down members, whereby said second and third hold-down members will remain out of contact with the inner top edges of said juxtaposed batteries when less than a predetermined clamping force is applied by said fastener means.

2. Apparatus as claimed in claim 1, in which each one of said first, second, third and fourth hold-down members comprises an angle member having the inside surface of one leg of the angle engageable with the top surface of a battery, and the inside surface of the other leg extending alongside a side wall of the battery.

3. Apparatus as claimed in claim 1 in which said fastener means comprises at least one rod anchored at one end to said base and extending between said juxtaposed batteries, and means engageable with said rod spanning said second and third hold-down members for applying said clamping force.

4. Apparatus as claimed in claim 3, in which said rod is threaded at its free end, and said means engageable with said rod comprises a washer received over the free end of said rod and having a diameter sufficient to span said second and third hold-down members, and a nut in threaded engagement with said rod.

5. A hold-down device for use with a pair of storage batteries supported in juxtaposed position on a base, including a frame, said frame comprising a first hold-down member engageable with an outside top edge of one of said juxtaposed batteries, a second hold-down member engageable with an inside top edge of said one battery, a third hold-down member engageable with the adjacent inside top edge of the other of said juxtaposed batteries, a fourth hold-down member engageable with an outside top edge of said other battery, and first and second substantially parallel end members attached to and connecting said first, second, third and fourth hold-down members; and fastener means engageable with said frame and with said base to apply a clamping force on said batteries between said frame and said base; the improvement wherein said first and fourth hold-down members are attached to said end members in position to define a first plane, and said second and third hold-down members are attached to said end members in position to define a second plane substantially parallel to said first plane but offset a predetermined distance therefrom, the application of said clamping force being operable to deflect said end members to close said offset distance when a predetermined clamping force is applied.

6. A hold-down device, for use with a plurality of storage batteries supported side by side on a base, comprising a frame engageable with the upper edges of the batteries, and fastener means clamping said batteries between said frame and said base; said frame comprising a first pair of edge engaging members spaced apart to engage opposed side edges of a first battery, a second pair of edge engaging members spaced apart to engage opposed side edges of a second battery, a pair of end plates attached to and connecting the opposed ends of said first and second pairs of edge engaging members, and means associated with said fastener means for engaging the edge engaging members associated with the adjacent edges of said side-by-side batteries, the improvement wherein the edge engaging members associated with said adjacent battery edges are attached to said end plates in offset relation to the remaining edge engaging members, whereby said adjacent edges contact the associated battery edges only after said fastener means is tightened sufficiently to deflect said end plates to overcome said offset.

* * * * *